Feb. 21, 1956   J. W. MANNING   2,735,633
JET PROPELLED AIRCRAFT
Filed July 1, 1953
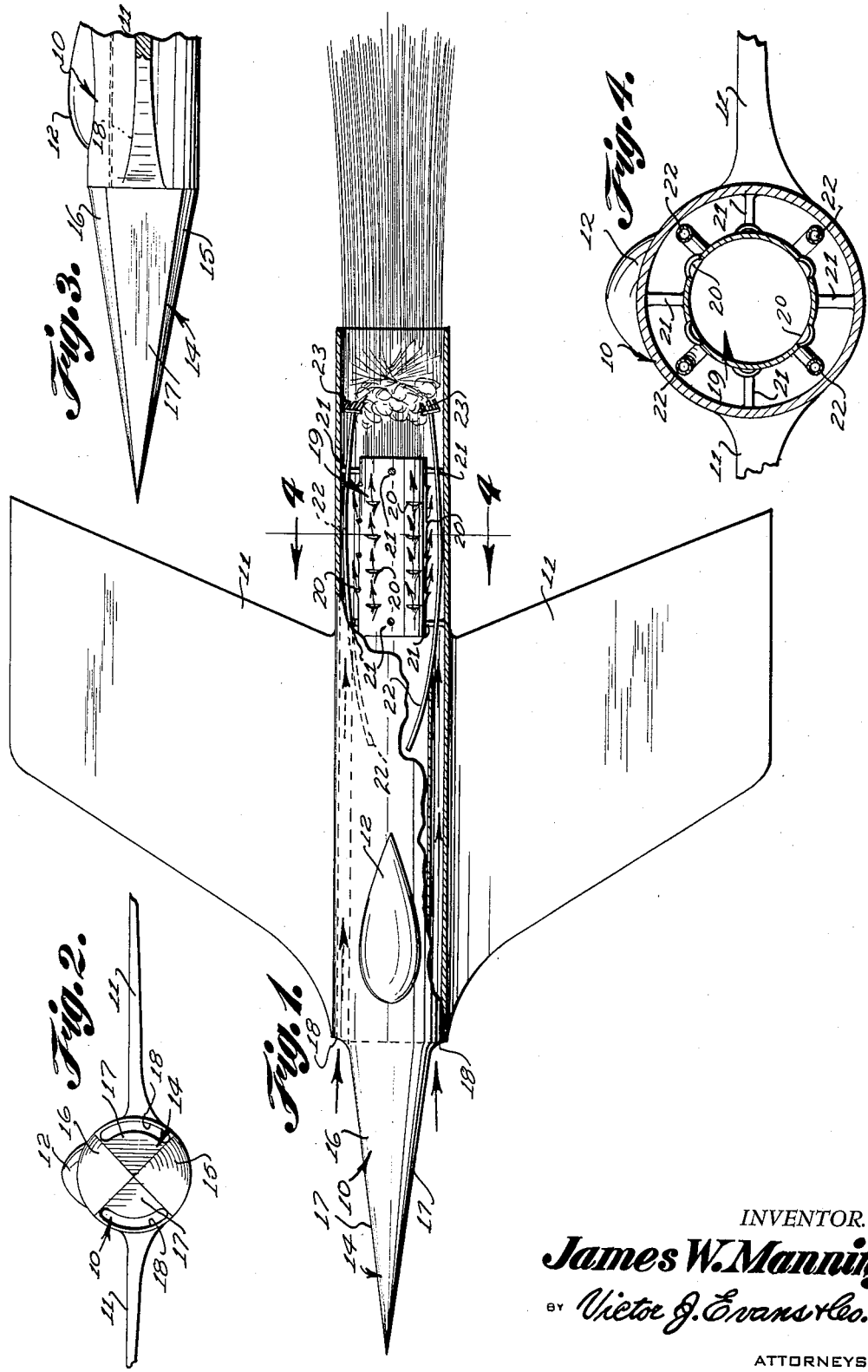
INVENTOR.
James W. Manning
BY Victor J. Evans & Co.
ATTORNEYS United States Patent Office 2,735,633
Patented Feb. 21, 1956

2,735,633
JET PROPELLED AIRCRAFT
James W. Manning, Huntington Park, Calif.
Application July 1, 1953, Serial No. 365,473
1 Claim. (Cl. 244—74)

This invention relates to an aircraft, and more particularly to a jet propelled aircraft.

The object of the invention is to provide a jet propelled aircraft which includes a novel louvered tail pipe.

Another object of the invention is to provide a means for increasing the thrust of jet aircraft, the present invention utilizing air drawn from the nose of the plane, the louvered tail pipe providing an after burner.

A further object of the invention is to provide an aircraft which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a top plan view of the aircraft, constructed according to the present invention, with parts broken away and in section.

Figure 2 is a front elevational view of the aircraft.

Figure 3 is a side elevational view showing the front portion of the aircraft, with parts broken away and in section.

Figure 4 is a sectional view taken on the line 4—4 of Figure 1.

Referring in detail to the drawings, the numeral 10 designates the body of the aircraft which may be made of any suitable material, and suitable wings 11 may extend from the body 10. A cockpit 12 may be provided for the pilot.

There is further provided a pointed nose 14 on the front of the body and the nose 14 has its bottom surface 15 and top surface 16 rounded or curved, while the side portions 17 of the nose are flat.

There is provided in the body 10 a plurality of ducts or passageways 18 for the passage therethrough of air, and arranged in the rear portion of the aircraft is a louvered tail pipe 19. The tail pipe 19 is provided with a plurality of cut-outs or openings 20, and the tail pipe 19 may be supported by suitable ribs 21.

A plurality of pipes or conduits 22 are arranged in the body 10, and the pipes 22 are adapted to be connected to a suitable source of fuel such as kerosene. A spray head 23 is mounted on the rear end of each of the pipes 22.

From the foregoing it is apparent that an aircraft has been provided which will develop an increased thrust. In use as the plane moves through the air, a certain amount of cold air will pass through the passageways 18 to the vicinity of the tail pipe 19. The conventional combustion chamber may be arranged in front of the tail pipe 19 and the gases ejected from the combustion chamber may pass through the tail pipe 19. An additional amount of fuel from the fuel tank may pass through the pipes 22 and the fuel passing through the pipes 22 will mix with some of the air at the rear of the tail pipe 19. Thus, there will be increased combustion or thrust produced at the rear of the tail pipe 19 to augment the thrust of the aircraft.

The present invention utilizes air drawn from the nose of the plane through air ducts 18 on both sides of the fuselage. The louvered tail pipe 19 permits part of the engine jet stream to escape through the louvers 20 to thereby create a suction and pull the air back through the air ducts 18 thus reducing the air pressure on the nose of the plane. The air drawn back by part of the engine jet stream is carried behind the louvers to a combustion chamber where it is mixed with kerosene vapor passing or issuing from the heads 23. This mixture when ignited or detonated causes a continuous kerosene explosion to increase the thrust of the aircraft. The louvered tail pipe 19 is held in position by the ribs 21 and this construction of the tail pipe creates a suction so that air is drawn in from the front of the plane through the ducts 18 to thereby reduce resistance on the front of the plane and increase the thrust or speed of the plane. It will be noted that the louvers 20 flare outwardly, Figure 4, and this construction permits a portion of the discharged gases to escape outwardly through the louvers 20 but does not permit any of the cold unburned air into the tail pipe 19. It will further be seen that there is provided a combustion chamber in the rear portion of the body 10 where fuel is supplied by the heads 23 and this fuel coacts with the air from the ducts 18 to produce additional thrust for the aircraft. The present invention is simple and economical to construct and the construction of the nose 14 including the flat sides 17 and the curved bottom 15 and curved top 16 helps reduce friction and helps to deflect air into the ducts 18.

From the foregoing it will be seen that there has been provided a louvered tail pipe which creates suction to draw air in from the front of the plane. The present invention can be used on military as well as civilian aircraft. It will be seen from the drawings that the extended leading edges of the wings terminate at the nose taper or pointed nose 14 and the purpose of having the leading edge terminating at the tapered nose is to require less runway, less drag and produce a greater lifting power.

I claim:

In an aircraft, a body having a pointed nose on the front end thereof, said nose having its bottom and top surfaces rounded and the side portions of said nose being flat, said body having a pair of spaced apart parallel passageways therein having forwardly facing intake openings for the egress therethrough of air, said passageways extending longitudinally through said body, a longitudinally disposed louvered tail pipe positioned within said body adjacent the rear end thereof, said tail pipe adapted to receive gases from a combustion chamber, said tail pipe being provided with a plurality of spaced cut outs, said passageways communicating with said tail pipe through said cut outs whereby said tail pipe creates suction so that air is drawn in from the front of the aircraft through said passageways to thereby reduce resistance on the front of the aircraft and increase the thrust or speed of the aircraft, a plurality of spaced apart conduits extending to the rear of said body and adapted to be connected to a source of fuel, a spray head mounted on the rear of each of said conduits and positioned rearwardly of said tail pipe, said tail pipe having its ends opened, said cut outs being defined by struck out portions which flare outwardly and rearwardly whereby a portion of the gases passing through the tail pipe is permitted to escape outwardly through the cut outs and whereby cold unburned air can not pass into the tail pipe, the fuel supplied by said spray heads adapted to be burned with the air from said passageways to produce additional thrust for the aircraft.

References Cited in the file of this patent
UNITED STATES PATENTS

| | | |
|---|---|---|
| 1,839,880 | Hyatt | Jan. 5, 1932 |
| 2,509,890 | Stalker | June 30, 1950 |
| 2,541,900 | Williams | Feb. 13, 1951 |
| 2,584,961 | Beck | Feb. 5, 1952 |
| 2,625,792 | McCarthy | Jan. 20, 1953 |
| 2,653,445 | Halford | Sept. 29, 1953 |